(12) United States Patent
Fatemi et al.

(10) Patent No.: US 12,062,946 B2
(45) Date of Patent: Aug. 13, 2024

(54) REINFORCED ROTOR FOR AN ELECTRIC MACHINE

(71) Applicant: GM Global Technology Operations LLC, Detroit, MI (US)

(72) Inventors: Alireza Fatemi, Canton, MI (US); Anthony Michael Coppola, Rochester Hills, MI (US); Derek Frei Lahr, Howell, MI (US); Kestutis A. Sonta, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/374,244

(22) Filed: Jul. 13, 2021

(65) Prior Publication Data

US 2023/0017309 A1 Jan. 19, 2023

(51) Int. Cl.
*H02K 1/28* (2006.01)
*H02K 1/32* (2006.01)

(52) U.S. Cl.
CPC ............... *H02K 1/28* (2013.01); *H02K 1/32* (2013.01)

(58) Field of Classification Search
CPC .......... H02K 1/28; H02K 1/32; H02K 1/2766; H02K 21/14
See application file for complete search history.

(56) References Cited

U.S. PATENT DOCUMENTS

| | | | |
|---|---|---|---|
| 8,937,422 B2 * | 1/2015 | Enomoto | H01F 3/04 310/43 |
| 10,666,099 B1 | 5/2020 | Fatemi et al. | |
| 10,923,969 B2 | 2/2021 | Fatemi et al. | |
| 2005/0285468 A1 * | 12/2005 | Fukushima | H02K 1/2706 310/156.53 |
| 2012/0169158 A1 * | 7/2012 | Buttner | H02K 9/225 29/596 |
| 2013/0162063 A1 | 6/2013 | Sasajima | |
| 2014/0042834 A1 * | 2/2014 | Asahi | H02K 1/276 310/43 |
| 2014/0368082 A1 | 12/2014 | Barton | |
| 2015/0145366 A1 * | 5/2015 | Akashi | H02K 1/276 29/598 |
| 2015/0180307 A1 | 6/2015 | Lnuzuka | |
| 2016/0065024 A1 * | 3/2016 | Zhang | H02K 15/10 427/299 |
| 2017/0373550 A1 | 12/2017 | Soma | |
| 2019/0173337 A1 | 6/2019 | Shimokawa et al. | |
| 2022/0278584 A1 * | 9/2022 | Høyland | H02K 15/03 |
| 2023/0018286 A1 * | 1/2023 | Fatemi | H02K 1/276 |
| 2023/0018618 A1 | 1/2023 | Fatemi et al. | |

* cited by examiner

*Primary Examiner* — Bernard Rojas
(74) *Attorney, Agent, or Firm* — CANTOR COLBURN LLP

(57) ABSTRACT

A rotor for an electric machine includes a rotor body formed from a plurality of stacked laminations defining a first axial end and an opposing second axial end. Each of the plurality of stacked laminations includes a plurality of openings that are aligned so as to define a plurality of passages through the rotor body. A plurality of reinforcement elements extend through the plurality of stacked laminations. Each of the plurality of reinforcement elements is arranged in a corresponding one of the plurality of passages and includes a first end portion and a second end portion. The first end portion and the second end portion of select ones of the plurality of reinforcement elements extend outwardly of the first axial end and the second axial end.

20 Claims, 5 Drawing Sheets

REINFORCED ROTOR FOR AN ELECTRIC MACHINE

INTRODUCTION

The subject disclosure relates to the art of electric machines and, more particularly, to a reinforced rotor for an electric machine.

Rotors are typically formed from multiple stacked laminations which support a central hub and a plurality of magnets. Generally, each lamination includes multiple openings that create webs and which serve as cooling passages, magnet mounting locations and the like. Openings are also placed so as to reduce rotor weight and promote balance. The webs act as flux leakage paths which can reduce performance or increase operational costs of the electric machine.

Magnets are often inserted into the openings and held in place with an adhesive, such as an epoxy. In such cases, the openings will often include corrugated edges that help retain the magnets and enhance retention of the epoxy. In many cases, the epoxy does not bond to the magnets and simply serves as, for example, a wedge that prevents the magnets from moving. Magnet retention, flux leakage, and structural support are issues that may limit an overall operating speed of the rotor. Accordingly, it would be desirable to provide a rotor with structural support that can stabilize the magnets, reduce flux leakage, and enhance stiffness so that the rotor may accommodate high speed operations.

SUMMARY

Disclosed is a rotor for an electric machine including a rotor body formed from a plurality of stacked laminations defining a first axial end and an opposing second axial end. Each of the plurality of stacked laminations includes a plurality of openings that are aligned so as to define a plurality of passages through the rotor body. A plurality of reinforcement elements extend through the plurality of stacked laminations. Each of the plurality of reinforcement elements is arranged in a corresponding one of the plurality of passages and includes a first end portion and a second end portion. The first end portion and the second end portion of select ones of the plurality of reinforcement elements extend outwardly of the first axial end and the second axial end.

In addition to one or more of the features described herein a first end ring mounted to the first axial end, the first end ring including a first plurality of end ring openings, wherein the first end portion of the select ones of the plurality of reinforcement elements extend through corresponding ones of the first plurality of end ring openings.

In addition to one or more of the features described herein a second end ring mounted to the second axial end, the second end ring including a second plurality of end ring openings, wherein the second end portion of the select ones of the plurality of reinforcement elements extend through corresponding ones of the second plurality of end ring openings.

In addition to one or more of the features described herein the first end ring is formed from one of a metal and a polymer composite.

In addition to one or more of the features described herein the first end ring is formed from a polymer composite and metal.

In addition to one or more of the features described herein the polymer composite is bonded to the first end portion of each of the select ones of the plurality of reinforcement elements.

In addition to one or more of the features described herein the first end portion of each of the select ones of the plurality of reinforcement elements are connected.

In addition to one or more of the features described herein each of the plurality of reinforcement elements is formed from a non-electrically conductive material.

In addition to one or more of the features described herein the non-electrically conductive material includes one of a glass fiber composite, a basalt fiber composite, a ceramic composite, and a polymer.

In addition to one or more of the features described herein each of the plurality of reinforcement elements is formed from a non-magnetic electrically conductive material having a non-electrically conductive coating.

In addition to one or more of the features described herein the non-magnetic electrically conductive material includes one of a carbon fiber composite, stainless steel, and aluminum.

In addition to one or more of the features described herein the non-electrically conductive coating is one of an epoxy, a polymer, polyimide, acrylate, silicone, Polyetheretherketone (PEEK), polyetherketone (PEK), a polyamide, and a bismaleimide.

In addition to one or more of the features described herein the select ones of the plurality of reinforcement elements includes all of the plurality of reinforcement elements.

In addition to one or more of the features described herein a reinforcing member arranged amid the plurality of stacked laminations.

In addition to one or more of the features described herein the plurality of reinforcement elements includes a first plurality of reinforcement elements extending from the first axial end to a center of the rotor body and a second plurality of reinforcement elements extending from the second axial end toward the center of the rotor body.

In addition to one or more of the features described herein each of the first plurality of reinforcement elements includes a first end section that extends outwardly of the first axial end and a second end section that terminates in the rotor body.

In addition to one or more of the features described herein each of the second plurality of reinforcement elements includes a third end section that extends outwardly of the second axial end and a fourth end section that terminates in the rotor body, the second end section being spaced from the fourth end section within the rotor body.

In addition to one or more of the features described herein each of the plurality of passages taper from the first axial end toward a center of the rotor body, and taper from the second axial end toward the center of the rotor body.

In addition to one or more of the features described herein each of the plurality of passages taper from a first dimension at the first axial end to a second dimension, that is smaller than the first dimension at the center of the rotor body and each of the plurality of passages taper from a third dimension at the second axial end to a fourth dimension, that is smaller than the first dimension at the center of the rotor body.

In addition to one or more of the features described herein each of the second plurality of reinforcement elements includes a third end section that extends outwardly of the second axial end and a fourth end section that terminates in the rotor body, wherein the first end section is wider than the second end section and the third end section is wider than the fourth end section.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
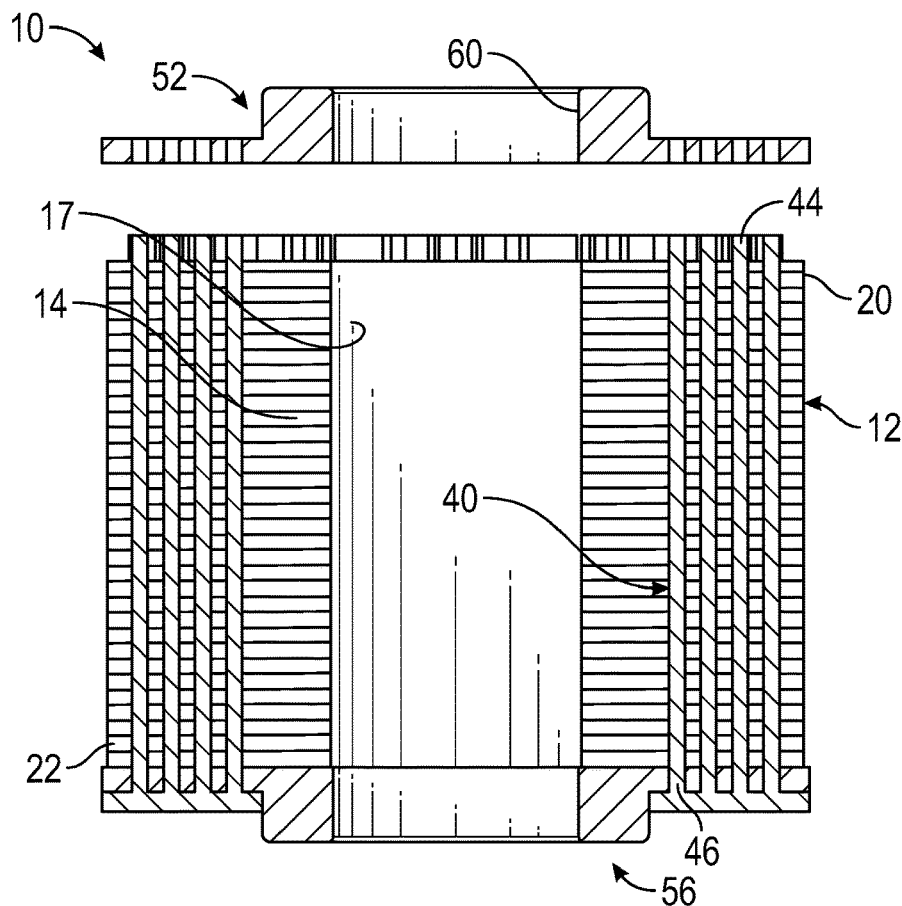
FIG. 1 is a partially disassembled cross-sectional side view of a rotor including a plurality of reinforcement elements and end rings, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
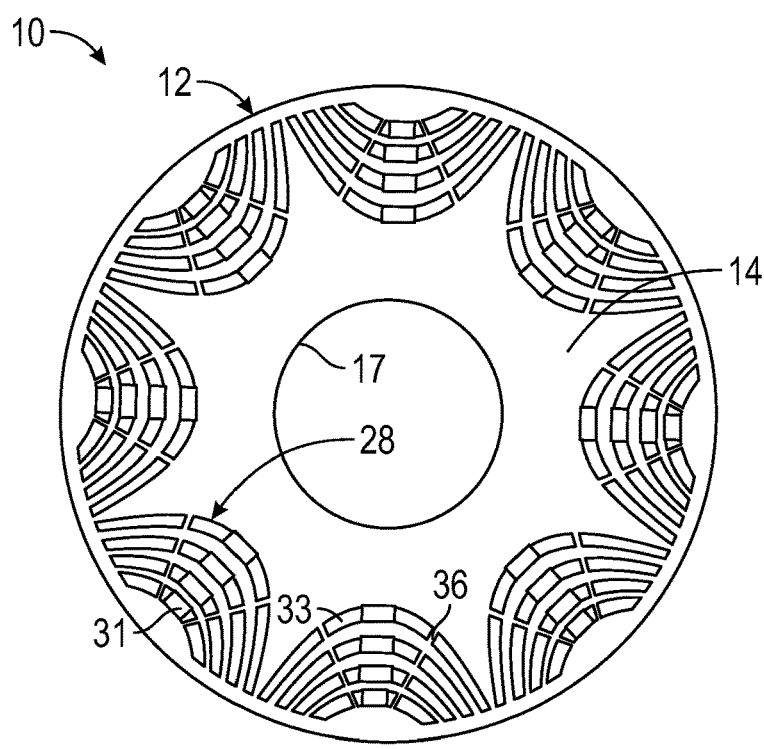
FIG. 2 is an axial end view of the rotor of FIG. 1, in accordance with a non-limiting example.

A rotor, in accordance with a non-limiting example, is indicated generally at 10 in FIGS. 1 and 2. Rotor 10 includes a body 12 formed from a plurality of stacked laminations 14 defining a central opening 17. Central opening 17 supports a shaft and/or bearings (not shown) that facilitate rotation of rotor 10 within a stator (also not shown). Body 12 includes a first axial end 20 and an opposing, second axial end 22. A plurality of openings 28 are formed in each of the plurality of stacked laminations 14. Openings 28 align one, with another, to define a plurality of magnet receiving passages 31 and a plurality or reinforcement element passages 33. Select ones of openings 28 are connected through bridges 36 so as to provide structural support for rotor 10.

In accordance with a non-limiting example, a plurality of reinforcement elements, one of which is indicated at 40, extend though corresponding ones of the plurality of reinforcement element passages 33. Each reinforcement element 40 includes a first end portion 44 and a second end portion 46. In a non-limiting example, first end portion 44 extends outwardly of body 12 at first axial end 20 and second end portion 46 extends outwardly of body 12 at second axial end 22. A first end ring 52 is provided at first axial end 20 and a second end ring 56 is provided at second axial end 22.

Figure 3:
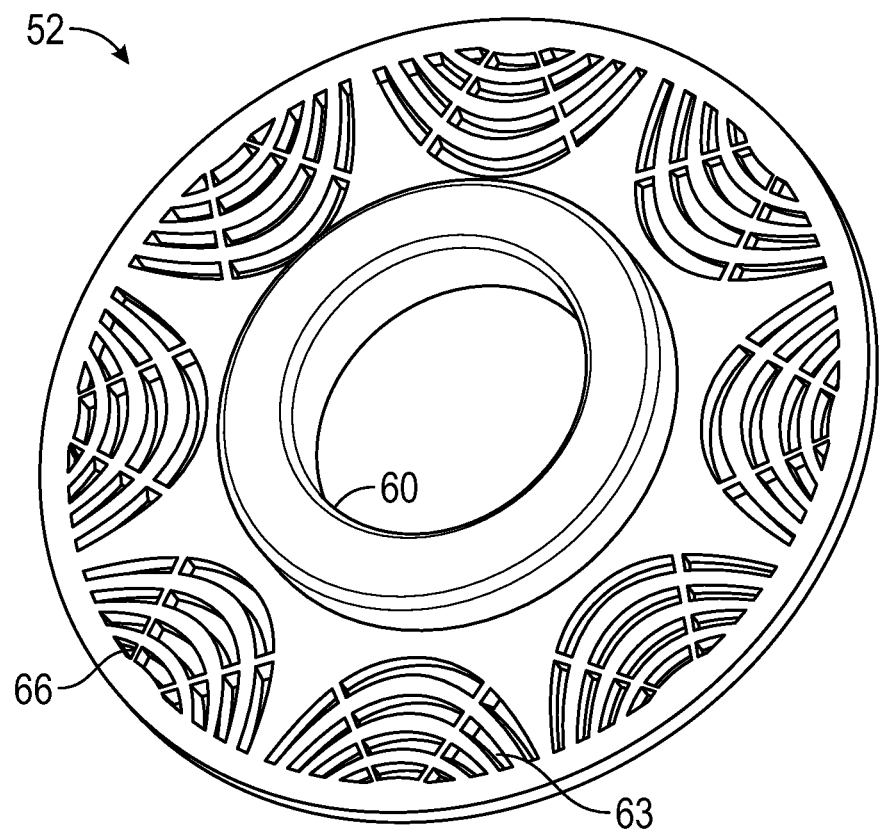
FIG. 3 is a perspective view of an end ring of the rotor of FIG. 1, in accordance with a non-limiting example.

Reference will now follow to FIG. 3 and with continued reference to FIG. 1, in describing first end ring 52 with an understanding that second end ring 56 is substantially similarly formed. First end ring 52 includes a central opening portion 60 that aligns with central opening 17 of body 12 and a plurality of opening portions 63 that align with corresponding ones of magnet receiving passages 31 and reinforcement element receiving passages 33. First end portion 44 of each of the plurality of reinforcement elements 40 extends through corresponding ones of the plurality of opening portions 63 in first end ring 52. In a non-limiting example, first end portions 44 may be joined, one to another, through first end ring 52.

In a non-limiting example, first end ring 52 shown in FIG. 3 is formed from a material that can provide structural support to body 12 while also facilitating balancing. First end ring 52 may be formed from a steel alloy or an aluminum alloy. In a non-limiting example, first end ring 52 and second end ring 56 may apply a compressive force to the plurality of stacked laminations 14. For example, first end ring 52 may be positioned on first axial end 20 with first end portions 44 extending through openings portions 53, and second end ring 56 may be positioned on second axial end 22 in a similar manner. Once in position, first and second end rings 52 and 56 may be heated so as to bond with first end portions 44 and second end portions 46. As first and second end rings 52 and 56 cool, a compressive force may be applied to body 12.

In a non-limiting example, a first amount of the plurality of laminations 14 may be aligned and formed into a first stack (not separately labeled). A first plurality of magnets (also not separately labeled) may then be inserted into corresponding ones of magnet receiving passages 31. A second amount of the plurality of laminations 14 may be aligned and formed into a second stack. (not separately labeled). A second plurality of magnets (not separately labeled) may be inserted into corresponding ones of the magnet receiving passages in the second stack. The second stack may then be positioned on and aligned with the first stack. The number of stacks may vary.

Figure 4:
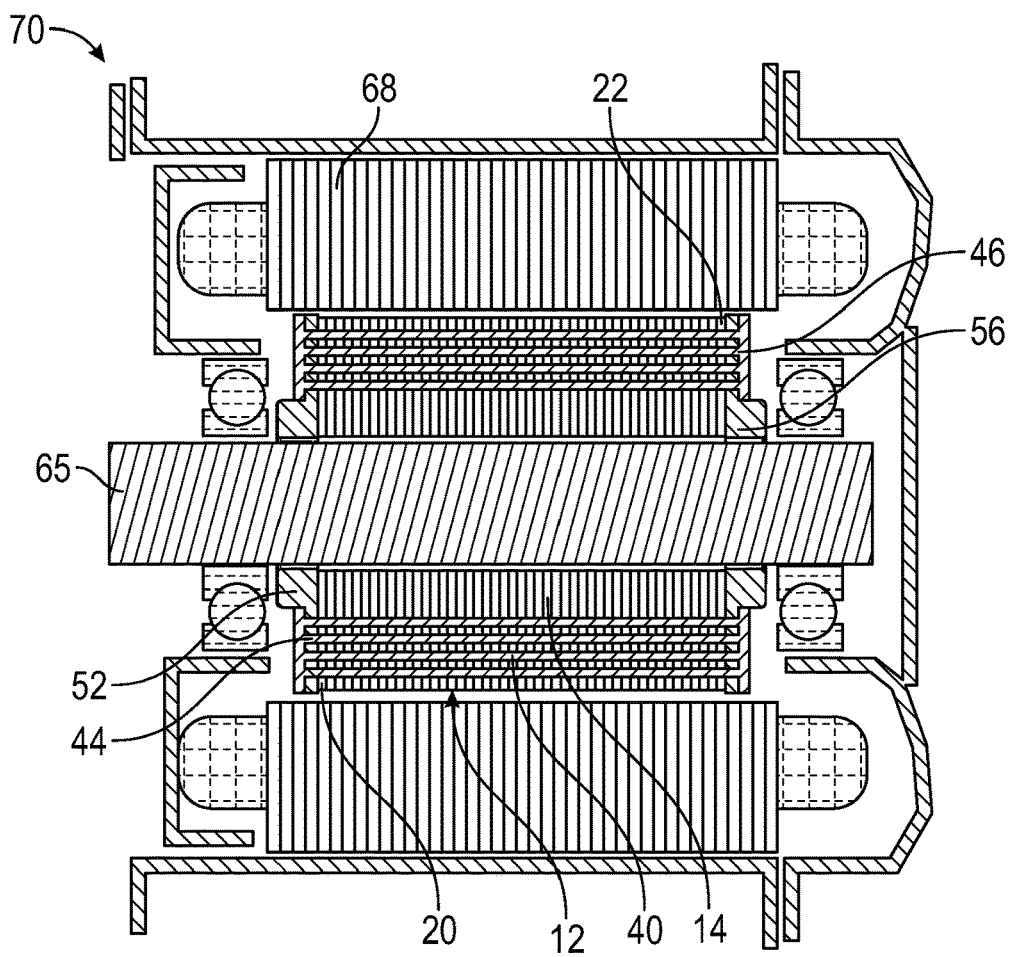
FIG. 4 depicts a cross-sectional side view of an electric machine including the rotor of FIG. 1, in accordance with a non-limiting example.

At this point, plurality of reinforcement elements 40 may be installed through the first and second stacks. Once all stacks are formed, aligned, and reinforcement elements 40 added, first end ring 52 and second end ring 56 may be installed as described herein. Referring to FIG. 4, rotor 10 may then receive a shaft 65 and be balanced as necessary before being installed within a stator 68 of an electric machine 70.

In another non-limiting example, first and second end rings 52 and 56 together with body 12 are heated. Once at a selected temperature, reinforcement elements 40 may be installed. At this point, first and second end rings 52 and 56 and body 12 are allowed to cool resulting in a compressive force being applied to the plurality of laminations 14.

Figure 5:
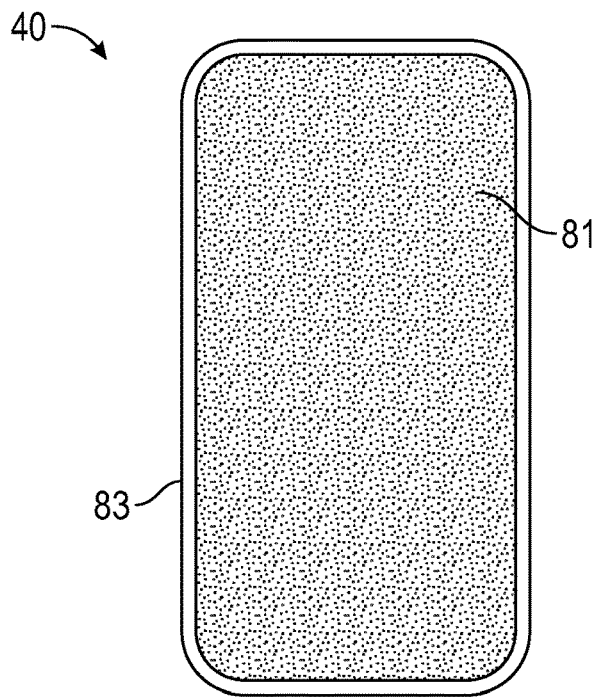
FIG. 5 is a cross-sectional end view of a reinforcement element, in accordance with a non-limiting example.

In a non-limiting example, the plurality of reinforcement elements 40 may be formed from various materials. For example, the plurality of reinforcement elements 40 may be made from a non-magnetic, non-electrically conductive material such as a glass fiber composite, a basalt fiber composite, a ceramic composite, and a polymer or the like. In another non-limiting example shown in FIG. 5, the plurality of reinforcement elements 40 may be formed from a non-magnetic, electrically conductive material 81 encapsulated in a non-electrically conductive coating 83. For example, the non-magnetic, electrically conductive material 81 may be one of a carbon fiber composite, a stainless steel, and an aluminum, and the non-electrically conductive coating may take the form of one of an epoxy, a polymer, a polyimide, an acrylate, a silicone, a Polyetheretherketone (PEEK), a polyetherketone (PEK), a polyamide, and a bismaleimide.

Figure 6:
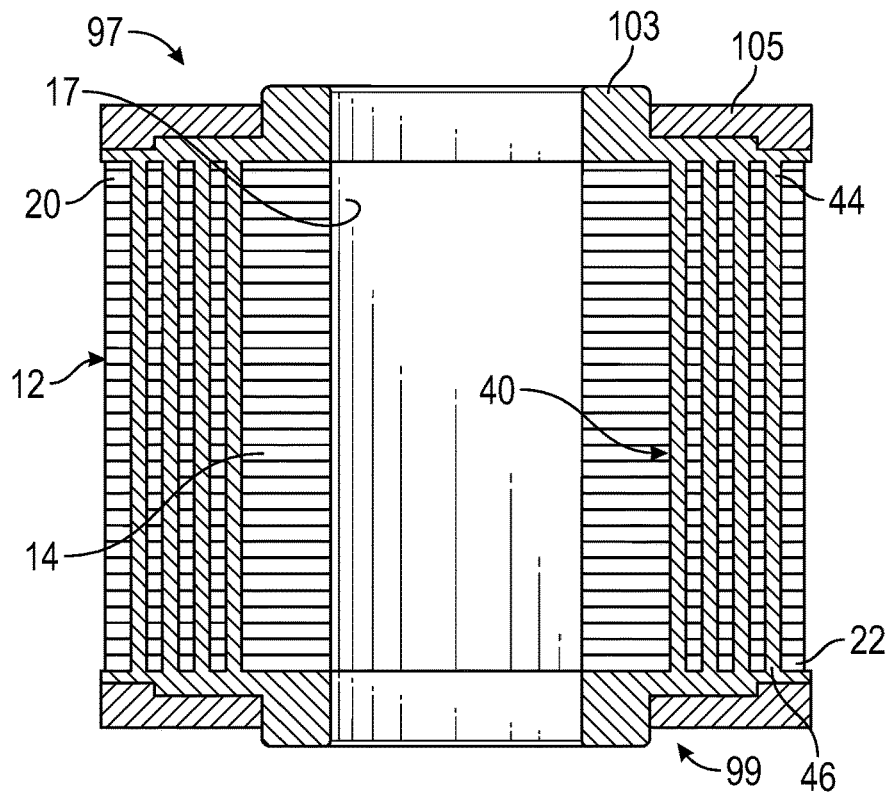
FIG. 6 is a cross-sectional side view of a rotor including reinforcement elements and end rings, in accordance with another non-limiting example.

Reference will now follow to FIG. 6 in describing a first end ring 97 and a second end ring 99 in accordance with another non-limiting example. At this point, it should be understood, that while the discussion references first end ring 97, second end ring 99 is substantially similarly formed. First end ring 97 includes a first portion 103 and a second portion 105. First portion 103 may be formed from the same material employed to form the plurality of reinforcement elements 40. For example, first portion 103 may be formed from non-magnetic, non-electrically conductive materials such as a glass fiber composite, a basalt fiber composite, a ceramic composite, and a polymer or the like. Second portion 105 may be formed from one of steel, aluminum, or the like. Thus, first end ring 97 defines a hybrid end ring with the first portion 103 providing an interconnection with first end portion 44 of each of the plurality of reinforcement elements 40 and the second portion 105 providing structural support and balancing.

Figure 7:
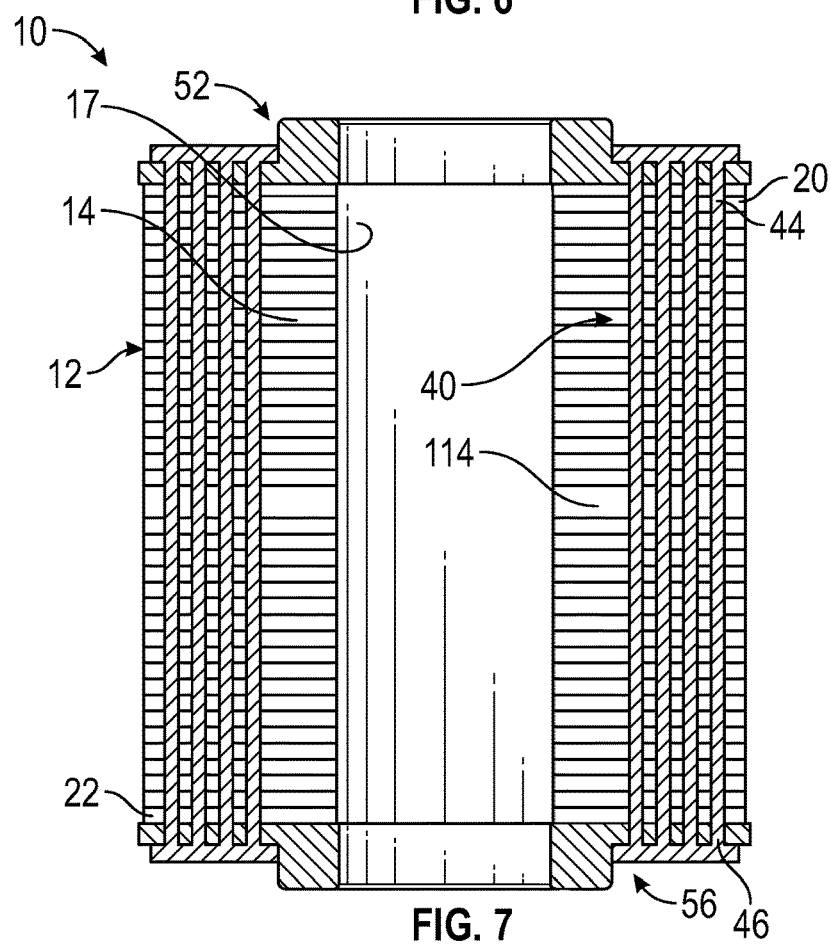
FIG. 7 is a cross-sectional side view of a rotor including reinforcement elements and end rings, in accordance with yet another non-limiting example.

FIG. 7 depicts a rotor 10 having a reinforcement member 114 provided within the plurality of laminations 14. Reinforcement member 114 supports reinforcement elements 40 and may provide additional structural stability that supports high speed operation. While shown as having a single reinforcement member 114, the number and position of reinforcement members 114 within the plurality of laminations 14 may vary.

Figure 8:
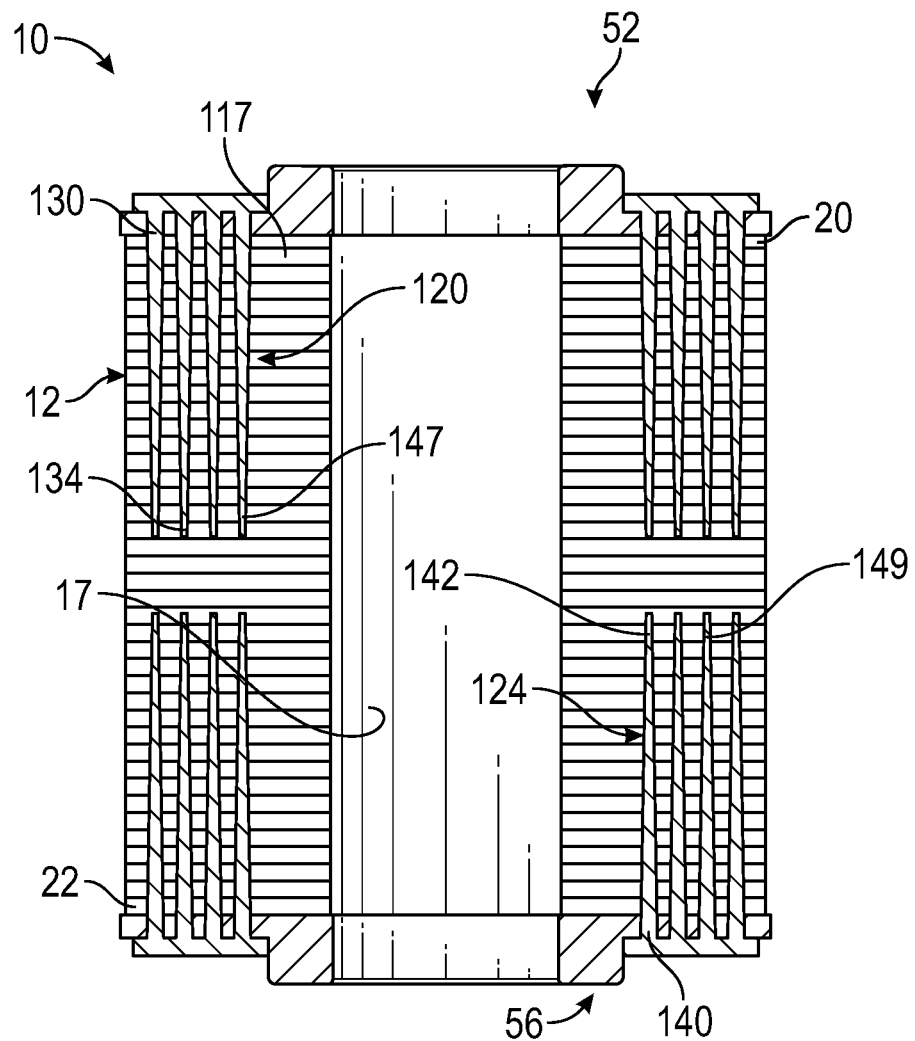
FIG. 8 is a cross-sectional side view of a rotor including reinforcement elements and end rings, in accordance with still yet another non-limiting example.

FIG. 8 depicts a rotor 10 including a first plurality of reinforcement elements 120 extending into body 12 from first axial end 20 and a second plurality of reinforcement elements 124 extending into body 12 from second axial end 22. First plurality of reinforcement elements 120 includes a first end section 130 arranged at first end ring 52 and a second end section 134 that terminates within body 12. Similarly, second plurality of reinforcement elements 124 includes a third end section 140 arranged at second end ring 56 and a fourth end section 142 that terminates within body 12. Second end section 134 of the first plurality of reinforcement elements 120 may be spaced from fourth end section 142 of the second plurality of reinforcement elements 124.

In a non-limiting example, first plurality of reinforcement elements 120 includes a tapered profile 147. Similarly, plurality of laminations 14 include passages 149 having a taper. In a non-limiting example, first end section 130 may have a dimension that is greater than second end section 134. Second plurality of reinforcement elements 124 may be substantially similarly formed. In this manner, additional reinforcement elements 120/124 may provide additional support at first and second axial ends 20 and 22 respectively. Further, the taper allow laminations toward a center portion (not separately labeled) of body 12 to have webs and bridges having a first thickness, and laminations further axially outwardly to have thinner webs and bridges.

At this point, it should be understood that the non-limiting examples described herein provide internal reinforcement elements in a rotor that add structural support allowing bridges to be removed and or reduced from rotor laminations to eliminate sources of internal magnetic flux leakage. The internal reinforcement also supports rotor magnets to reduce strain on epoxy and/or other adhesives used for attachment. In this manner, the rotor may be operated at higher speeds without experiencing magnet failure or requiring hefty magnet support bridges in each lamination. Further, end rings are constructed to provide support for the reinforcement elements while also providing a mass reduction without losing rotor balancing capability.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rotor for an electric machine comprising:
a rotor body formed from a plurality of stacked laminations defining a first axial end and an opposing second axial end, each of the plurality of stacked laminations including a plurality of groups of openings that are aligned so as to define a plurality of passages through the rotor body;
a first end ring including a first plurality of openings arranged at the first axial end;
a second end ring including a second plurality of openings arranged at the second axial end; and
a plurality of reinforcement elements extending through the plurality of stacked laminations, each of the plurality of reinforcement elements being arranged in a corresponding one of the plurality of passages and including a first end portion that passes through the first plurality of openings in the first end ring and a second end portion that passes through the second plurality of openings in the second end ring, wherein the first end portion of each of the plurality of reinforcement elements are joined to one another at the first axial end axially outwardly of the first end ring and the second end portion of each of the plurality of reinforcing elements are joined to one another at the second axial end axially outwardly of the second end ring,
wherein each of the plurality of groups of openings include of two or more magnet receiving passages that are adjacent to and radially aligned with one another.

2. The rotor according to claim 1, wherein the first end ring is formed from one of a metal and a polymer composite.

3. The rotor according to claim 2, wherein the first end ring is formed from a polymer composite and metal.

4. The rotor according to claim 3, wherein the polymer composite is bonded to the first end portion of each of the select ones of the plurality of reinforcement elements.

5. The rotor according to claim 1, wherein each of the plurality of reinforcement elements is formed from a non-electrically conductive material including one of a glass fiber composite, a basalt fiber composite, a ceramic composite, and a polymer.

6. The rotor according to claim 5, wherein the non-electrically conductive coating includes one of an epoxy, a polymer, polyimide, acrylate, silicone, Polyetheretherketone (PEEK), polyetherketone (PEK), a polyamide, and a bismaleimide.

7. The rotor according to claim 1, wherein the select ones of the plurality of reinforcement elements includes all of the plurality of reinforcement elements.

8. The rotor according to claim 1, further comprising: a reinforcing member arranged amid the plurality of stacked laminations.

9. The rotor according to claim 1, wherein the plurality of reinforcement elements includes a first plurality of reinforcement elements extending from the first axial end to a center of the rotor body and a second plurality of reinforcement elements extending from the second axial end toward the center of the rotor body.

10. The rotor according to claim 9, wherein each of the plurality of passages taper from the first axial end toward a center of the rotor body, and taper from the second axial end toward the center of the rotor body.

11. The rotor according to claim 1, further comprising a first connecting member arranged at the first axial end and a second connecting member arranged at the second axial end, wherein the first end portion of each of the plurality of reinforcing elements are connected to one another through the first connecting member and the second end portion of each of the plurality of reinforcing elements are connected to one another through the second connector member.

12. The rotor according to claim 11, wherein the first connecting member, the second connecting member, and each of the plurality of connecting elements are formed from the same material.

13. The rotor according to claim 1, wherein the plurality of groups of openings are circumferentially disposed around an outer portion of each of the plurality of stacked laminations.

14. The rotor according to claim 1, wherein each of the plurality of groups of openings include four magnet receiving passages that are adjacent to and radially aligned with one another.

15. An electric machine comprising:
a stator; and
a rotor rotatably arranged within the stator, the rotor comprising:
a rotor body formed from a plurality of stacked laminations defining a first axial end and an opposing second axial end, each of the plurality of stacked laminations including a plurality of groups of openings that are aligned so as to define a plurality of passages through the rotor body;
a first end ring including a first plurality of openings arranged at the first axial end;
a second end ring including a second plurality of openings arranged at the second axial end; and
a plurality of reinforcement elements extending through the plurality of stacked laminations, each of the plurality of reinforcement elements being arranged in a corresponding one of the plurality of passages and including a first end portion that passes through the first plurality of openings in the first end ring and a second end portion that passes through the second plurality of openings in the second end ring, wherein the first end portion of each of the plurality of reinforcement elements are joined to one another at the first axial end axially outwardly of the first end ring and the second end portion of each of the plurality of reinforcing elements are joined to one another at the second axial end axially outwardly of the second end ring,
wherein each of the plurality of groups of openings include of two or more magnet receiving passages that are adjacent to and radially aligned with one another.

16. The electric machine according to claim 15, wherein each of the plurality of reinforcement elements is formed from a non-electrically conductive material.

17. The electric machine according to claim 15, wherein the plurality of groups of openings are circumferentially disposed around an outer portion of each of the plurality of stacked laminations.

18. The electric machine according to claim 15, wherein each of the plurality of groups of openings include four magnet receiving passages that are adjacent to and radially aligned with one another.

19. A system comprising:
a stator; and
a rotor disposed within the stator, the rotor including:
a rotor body formed from a plurality of stacked laminations defining a first axial end and an opposing second axial end, each of the plurality of stacked laminations including a plurality of groups of openings that are aligned so as to define a plurality of passages through the rotor body; and
a plurality of reinforcement elements extending through the plurality of stacked laminations, each of the plurality of reinforcement elements being arranged in a corresponding one of the plurality of passages and including a first end portion and a second end portion, wherein the first end portion and the second end portion of select ones of the plurality of reinforcement elements extend outwardly of the first axial end and the second axial end, wherein the first end portion of each of the plurality of reinforcement elements are joined to one another at the first axial end and the second end portion of each of the plurality of reinforcing elements are joined to one another at the second axial end,
wherein each of the plurality of groups of openings include of two or more magnet receiving passages that are adjacent to and radially aligned with one another.

20. The system of claim 19, wherein the plurality of groups of openings are circumferentially disposed around an outer portion of each of the plurality of stacked laminations.

* * * * *